US012406462B2

United States Patent
Zhu et al.

(10) Patent No.: US 12,406,462 B2
(45) Date of Patent: Sep. 2, 2025

(54) METHOD AND DEVICE FOR DETECTING BAD POINTS IN VIDEO AND COMPUTER READABLE MEDIUM

(71) Applicant: BOE TECHNOLOGY GROUP CO., LTD., Beijing (CN)

(72) Inventors: Dan Zhu, Beijing (CN); Ran Duan, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 571 days.

(21) Appl. No.: 17/771,941

(22) PCT Filed: Jul. 5, 2021

(86) PCT No.: PCT/CN2021/104492
§ 371 (c)(1),
(2) Date: Apr. 26, 2022

(87) PCT Pub. No.: WO2022/042040
PCT Pub. Date: Mar. 3, 2022

(65) Prior Publication Data
US 2022/0377265 A1 Nov. 24, 2022

(30) Foreign Application Priority Data
Aug. 25, 2020 (CN) .................. 202010862824.5

(51) Int. Cl.
*G06V 10/44* (2022.01)
*G06T 5/50* (2006.01)
*G06V 10/28* (2022.01)

(52) U.S. Cl.
CPC .............. *G06V 10/443* (2022.01); *G06T 5/50* (2013.01); *G06V 10/28* (2022.01); *G06T 2207/20224* (2013.01)

(58) Field of Classification Search
CPC . H04N 25/68; G06T 5/50; G06T 2207/20224; G06T 2207/10016; G06T 7/00; G06V 10/28
See application file for complete search history.

(56) References Cited

U.S. PATENT DOCUMENTS 4,823,194 A * 4/1989 Mishima ................ G06V 10/20
358/464
4,866,785 A * 9/1989 Shibano .................... G06T 5/30
382/302

(Continued)

FOREIGN PATENT DOCUMENTS

CN 103873880 B * 11/2018 ............. G06T 5/002
CN 108322724 B * 8/2019 ............... G06T 7/11

(Continued)

OTHER PUBLICATIONS

R. M. Haralick, S. R. Sternberg and X. Zhuang, "Image Analysis Using Mathematical Morphology," in IEEE Transactions on Pattern Analysis and Machine Intelligence, vol. PAMI-9, No. 4, pp. 532-550, Jul. 1987, doi: 10.1109/TPAMI.1987.4767941. (Year: 1987).*

(Continued)

*Primary Examiner* — Michael Robert Cammarata
(74) *Attorney, Agent, or Firm* — HOUTTEMAN LAW LLC

(57) ABSTRACT

Embodiments of the disclosure provide a method for detecting bad points in a video, including: performing extreme filtering respectively on first, second and third frames of images which are sequentially and continuously in the video to obtain first, second and third filtered images, respectively; wherein the extreme filtering is one of maximum filtering and minimum filtering; determining first and second difference images according to the first, second and third filtered images; determining a candidate image according to the first and second difference images; and determining that at least (Continued)

part of points in the second frame of image corresponding to the valid point in the candidate image are bad points. The embodiment of the disclosure also provides a device and a computer-readable medium for detecting bad points in the video.

11 Claims, 11 Drawing Sheets

(56) References Cited

U.S. PATENT DOCUMENTS

| | | | | |
|---|---|---|---|---|
| 5,245,432 | A * | 9/1993 | Jaffray | H04N 1/40093 348/578 |
| 5,546,135 | A * | 8/1996 | Okamoto | H04N 5/142 348/E5.064 |
| 9,124,832 | B2 * | 9/2015 | Kolli | H04N 25/134 |
| 11,310,467 | B2 * | 4/2022 | Allen | H04N 23/56 |
| 2010/0142855 | A1 * | 6/2010 | Dokladalova | G06T 7/11 382/308 |
| 2015/0022393 | A1 * | 1/2015 | Nishiyama | G01S 7/02 342/175 |
| 2015/0213702 | A1 * | 7/2015 | Kimmel | G06V 20/52 382/103 |
| 2016/0117837 | A1 * | 4/2016 | Baltsen | G06V 20/58 382/103 |
| 2021/0192702 | A1 * | 6/2021 | Volante | G06T 7/11 |
| 2023/0316555 | A1 * | 10/2023 | Spangenberg | G06V 10/82 345/419 |

FOREIGN PATENT DOCUMENTS

| | | | | |
|---|---|---|---|---|
| JP | 2903923 | B2 * | 6/1999 | |
| JP | 2006517663 | A * | 7/2006 | |
| JP | 2017219478 | A * | 12/2017 | G01B 11/30 |
| KR | 101470191 | B1 * | 12/2014 | |

OTHER PUBLICATIONS

Jacob, Grasha, R. Shenbagavalli, and S. Karthika. "Detection of surface defects on ceramic tiles based on morphological techniques." arXiv preprint arXiv:1607.06676 (2016). (Year: 2016).*

H. Liu, J. Dai, R. Wang, H. Zheng and B. Zheng, "Combining background subtraction and three-frame difference to detect moving object from underwater video," OCEANS 2016—Shanghai, Shanghai, China, 2016, pp. 1-5, doi: 10.1109/OCEANSAP.2016.7485613. (Year: 2016).*

M. Nawaz, J. Cosmas, P. I. Lazaridis, Z. D. Zaharis, Y. Zhang and H. Mohib, "Precise Foreground Detection Algorithm Using Motion Estimation, Minima and Maxima Inside the Foreground Object," in IEEE Transactions on Broadcasting, vol. 59, No. 4, pp. 725-731, Dec. 2013, doi: 10.1109/TBC.2013.2282733. (Year: 2013).*

R. A. Peters, "A new algorithm for image noise reduction using mathematical morphology," in IEEE Transactions on Image Processing, vol. 4, No. 5, pp. 554-568, May 1995, doi: 10.1109/83.382491. (Year: 1995).*

* cited by examiner

M

M'  M"

mask

M

M'  M"

mask

//METHOD AND DEVICE FOR DETECTING BAD POINTS IN VIDEO AND COMPUTER READABLE MEDIUM

CROSS REFERENCE TO RELATED APPLICATION

This application is a National Phase Application filed under 35 U.S.C. 371 as a national stage of PCT/CN2021/104492, filed on Jul. 5, 2021, the contents of which are incorporated herein by reference in their entirety.

TECHNICAL FIELD

Embodiments of the disclosure relate to the field of video processing technology, in particular to a method and a device for detecting bad points in a video and a computer readable medium.

BACKGROUND

Due to data damage and the like, bad points, i.e., points having incorrect display contents, may occur in the video, thereby degrading the video quality. A typical bad point is a point in an image of a certain frame that is brighter (whiter) or darker (blacker) than the corresponding points in adjacent frames.

However, since the video is dynamic, the brightness of each of many corresponding points is different in the images of adjacent frames even under normal conditions (for example, the brightness is different due to the scene motion), and in the existing method for detecting bad points in a video, it is difficult to identify such the normal points, thereby resulting in inaccurate detection.

SUMMARY

The embodiment of the disclosure provides a method and a device for detecting bad points in a video and a computer readable medium.

In a first aspect, an embodiment of the present disclosure provides a method for detecting bad points in a video, including:
performing extreme filtering on a first frame of image, a second frame of image and a third frame of image which are sequentially and continuously in the video, respectively, to obtain a first filtered image, a second filtered image and a third filtered image, respectively; the extreme filtering being one of a maximum filtering and a minimum filtering;
determining a first difference image and a second difference image according to the first filtered image, the second filtered image and the third filtered image; when the extreme filtering is the maximum filtering, a brightness of each point in the first difference image is a difference between a brightness of the corresponding point in the second filtered image and a brightness of a corresponding point in the first filtered image, and a brightness of each point in the second difference image is a difference between a brightness of a corresponding point in the second filtered image and a brightness of a corresponding point in the third filtered image; when the extreme filtering is the minimum filtering, a brightness of each point in the first difference image is a difference between a brightness of the corresponding point in the first filtered image and a brightness of the corresponding point in the second filtered image, and a brightness of each point in the second difference image is a difference between a brightness of a corresponding point in the third filtered image and a brightness of a corresponding point in the second filtered image;
determining a candidate image according to the first difference image and the second difference image; a point in the candidate image whose corresponding point in the first difference image has a brightness exceeding a first threshold value and whose corresponding point in the second difference image has a brightness exceeding a second threshold value is a valid point, and the remaining points in the candidate image are invalid points; and
determining that at least part of points in the second frame of image corresponding to the valid point in the candidate image are bad points.

In some embodiments, the performing the extreme filtering on the first frame of image, the second frame of image and the third frame of image which are sequential and consecutive in the video respectively includes:
converting the first frame of image, the second frame of image and the third frame of image into gray scale images, respectively, a brightness of each point of the gray scale images being represented by a gray scale value; and
performing the extreme filtering on the gray scale image of the first frame of image, the gray scale image of the second frame of image and the gray scale image of the third frame of image, respectively.

In some embodiments, the performing the extreme filtering respectively on the first frame of image, the second frame of image and the third frame of image which are sequential and consecutive in the video includes:
performing the extreme filtering multiple times, with a plurality of windows having sequentially reduced lengths, on each of the first frame image, the second frame image and the third frame image.

In some embodiments, the determining a candidate image according to the first difference image and second difference image includes:
determining a first binarized image according to the first difference image, and determining a second binarized image according to the second difference image; a point in the first binarized image whose corresponding point in the first difference image has a brightness exceeding the first threshold value is a first valid point, and a point in the second binarized image whose corresponding point in the second difference image has a brightness exceeding the second threshold value is a second valid point; and
determining the candidate images according to the first binarized image and the second binarized image; a point in the candidate image whose corresponding point in the first binarized image is the first valid point and whose corresponding point in the second binarized image is the second valid point being a valid point, and the remaining points in the candidate image being invalid points.

In some embodiments, before determining the first binarized image from the first difference image and determining the second binarized image from the second difference image, the method further includes:
normalizing a brightness of all points in the first difference image into a number greater than or equal to 0 and less than or equal to 1 by taking a brightness of a point in the first difference image with a maximum brightness as 1 and a minimum brightness as 0; normalizing a brightness of all the points in the second difference image into a number greater than or equal to 0 and less than or equal to 1 by taking a brightness of a point in the second difference image with a maximum brightness as 1 and a minimum brightness as 0;

the first threshold value T1 is calculated by following formula: T1=(1−minN1)*factor;

the second threshold value T2 is calculated by following formula: T2=(1−minN2)*factor;

the minN1 is a normalized brightness of the point whose brightness is minimum in the first difference image, the minN2 is a normalized brightness of the point whose brightness is minimum in the second difference image, and the factor is a preset coefficient larger than 0 and smaller than 1.

In some embodiments, the factor is greater than or equal to 0.1 and less than or equal to 0.5.

In some embodiments, the determining that the at least part of the points in the second frame of image corresponding to the valid point in the candidate images are bad points includes:

removing discrete valid points in the candidate image; and determining points in the second frame of image corresponding to the remaining valid points in the candidate image as bad points.

In some embodiments, the removing the discrete valid points in the candidate images includes:

performing a corrosion processing on the candidate image by taking the valid points as a foreground and the invalid points as a background; and performing an expansion processing on the candidate image by taking the valid point as a foreground and the invalid point as a background.

In some embodiments, a structural element for the corrosion processing is a square whose side length is greater than or equal to 7 and less than or equal to 15; and a structural element for the expansion processing is a square whose side length is greater than or equal to 7 and less than or equal to 15.

In a second aspect, an embodiment of the present disclosure provides a device for detecting bad points in a video, including:

an input module configured to receive the video;

an output module configured to output the detected bad points in the video;

one or more processors; and a memory having one or more programs stored thereon, that when executed by the one or more processors, cause the one or more processors to implement the method of detecting bad points in the video of any one of the methods described above;

one or more input/output interfaces connected between the one or more processors and the memory and configured to implement information interaction between the one or more processors and the memory.

In a third aspect, the present disclosure provides a computer readable medium, on which a computer program is stored, and which performs the method of detecting bad points in the video of any one of the methods described above, when being executed by a processor.

BRIEF DESCRIPTION OF DRAWINGS

The accompanying drawings are included to provide a further understanding of the embodiments of the disclosure, and are incorporated in and constitute a part of this specification, illustrate embodiments of the disclosure and together with the description serve to explain the principles of the disclosure and not to limit the disclosure. The above and other features and advantages will become more apparent to those skilled in the art by describing in detail example embodiments thereof with reference to the attached drawings, in which.

DETAIL DESCRIPTION OF EMBODIMENTS

Figure 1:
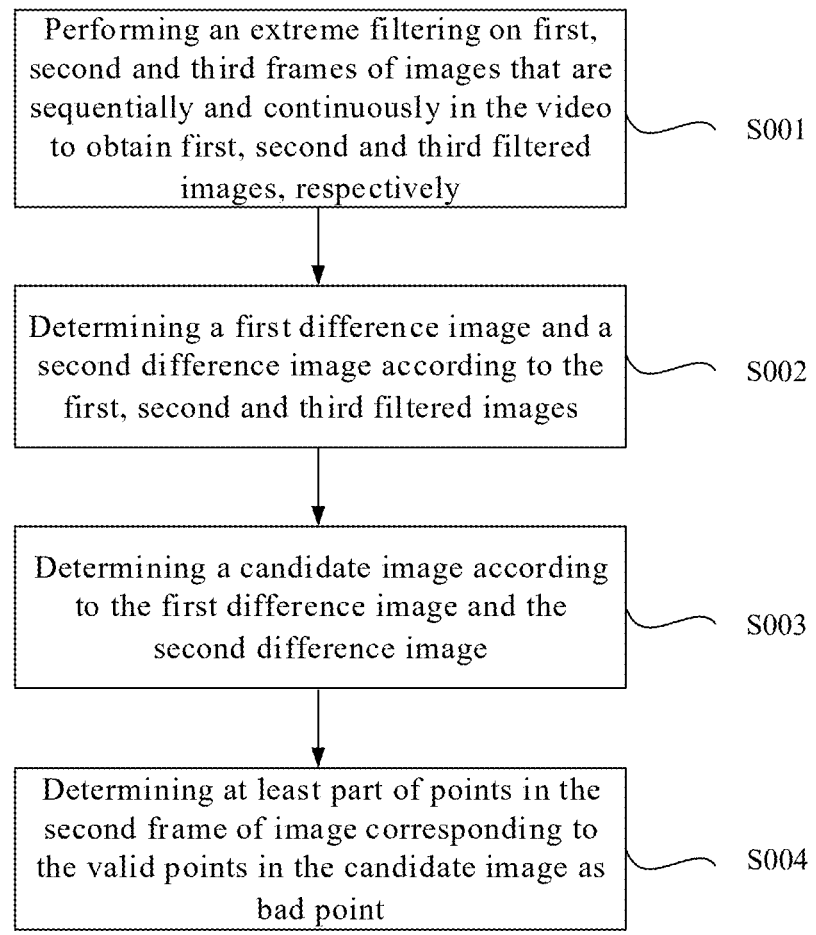
FIG. 1 is a flowchart of a method for detecting bad points in a video according to an embodiment of the present disclosure.

In order to make those skilled in the art better understand the technical solutions of the embodiments of the present disclosure, the method and device for detecting bad points in a video and the computer readable medium provided in the embodiments of the present disclosure are described in detail below with reference to the accompanying drawings.

The embodiments of the present disclosure will be described more fully hereinafter with reference to the accompanying drawings, but the embodiments shown may be embodied in different forms and should not be construed as limited to the embodiments set forth herein. Rather, these embodiments are provided so that this disclosure will be thorough and complete, and will fully convey the scope of the disclosure to those skilled in the art.

Embodiments of the present disclosure may be described with reference to plan and/or cross-sectional views by way of idealized schematic illustrations of the present disclosure. Accordingly, the example illustrations may be modified in accordance with manufacturing techniques and/or tolerances.

Embodiments and features of the embodiments of the disclosure may be combined with each other without conflict.

The terminology used in the disclosure is for the purpose of describing particular embodiments only and is not intended to be limiting of the disclosure. The term "and/or" as used in this disclosure includes any and all combinations of one or more of the associated listed items. The singular forms "a", "an" and "the" as used in this disclosure are intended to include the plural forms as well, unless the context clearly indicates otherwise. The terms "comprise", "include", "made of . . . ," as used in this disclosure, specify the presence of stated features, integers, steps, operations, elements, and/or components, but do not preclude the presence or addition of one or more other features, integers, steps, operations, elements, components, and/or combinations thereof.

Unless otherwise defined, all terms (including technical and scientific terms) used in this disclosure have the same meaning as commonly understood by one of ordinary skill in the art. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Embodiments of the present disclosures are not limited to the embodiments shown in the drawings, but include modifications of configurations formed based on a manufacturing process. Thus, the regions illustrated in the figures have schematic properties, and the shapes of the regions shown in the figures illustrate specific shapes of regions of elements, but are not intended to be limiting.

In a first aspect, referring to FIGS. 1 to 20, an embodiment of the present disclosure provides a method for detecting bad points in a video.

The method of the embodiment of the disclosure is used for detecting the bad points in the video. The bad point is a point having incorrect display contents due to data damage or the like.

In general, in any one frame of image in a video, the bad points can be divided into a "whiter point" that is significantly brighter than the corresponding point of the adjacent frame of image, and a "blacker point" that is significantly darker than the corresponding point of the adjacent frame of image.

The video is composed of multiple frames of images in sequence, each frame of image is equivalent to a static "picture", and is composed of multiple "points (or pixels)", and each point has a certain color and brightness (for example, represented by a gray scale value).

In the embodiments of the present disclosure, all images have the same size and shape, i.e., the arrangement of "points" therein is the same, while points in the same relative position in different images are mutually "corresponding points".

Referring to FIG. 1, a method for detecting bad points in a video according to an embodiment of the present disclosure includes the following steps S001 to S004.

At step S001, an extreme filtering is respectively performed on a first frame of image, a second frame of image and a third frame of image which are sequentially and continuously in the video to obtain a first filtered image, a second filtered image and a third filtered image, respectively.

The extreme filtering is one of maximum filtering and minimum filtering.

In this step, the extreme filtering is performed on the first frame of image, the second frame of image, and the third frame of image respectively to obtain the first filtered image, the second filtered image, and the third filtered image; the extreme filtering is specifically maximum filtering or minimum filtering. The maximum filtering and the minimum filtering are two modes for image filtering, and the specific meaning thereof will be described below.

The specific type of the extreme filtering is determined according to the type of the bad point to be detected: if the maximum filtering is performed, then white points in the video are detected subsequently; if the minimum filtering is performed, black points in the video are detected subsequently.

The first frame of image, the second frame of image and the third frame of image in this step are any three frames of images arranged in sequence in the video, that is, the second frame of image is immediately after the first frame of image, and the third frame of image is immediately after the second frame of image.

Figure 2:
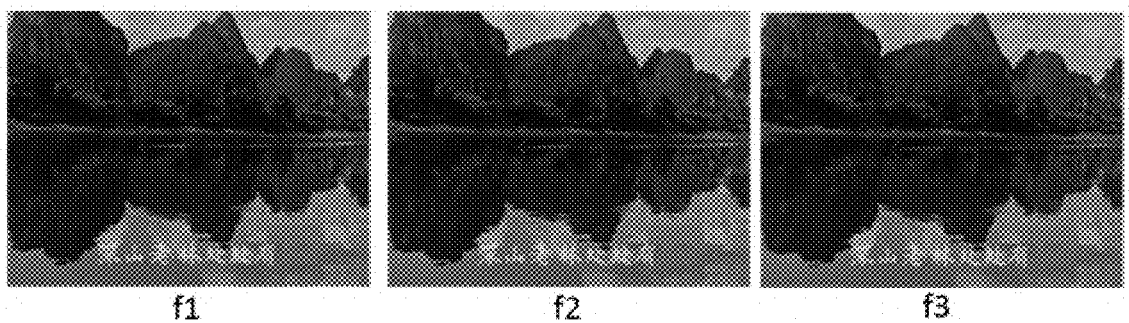
FIG. 2 is a schematic diagram of three frames of images to be processed in the method for detecting bad points in a video according to an embodiment of the present disclosure.
Figure 3:
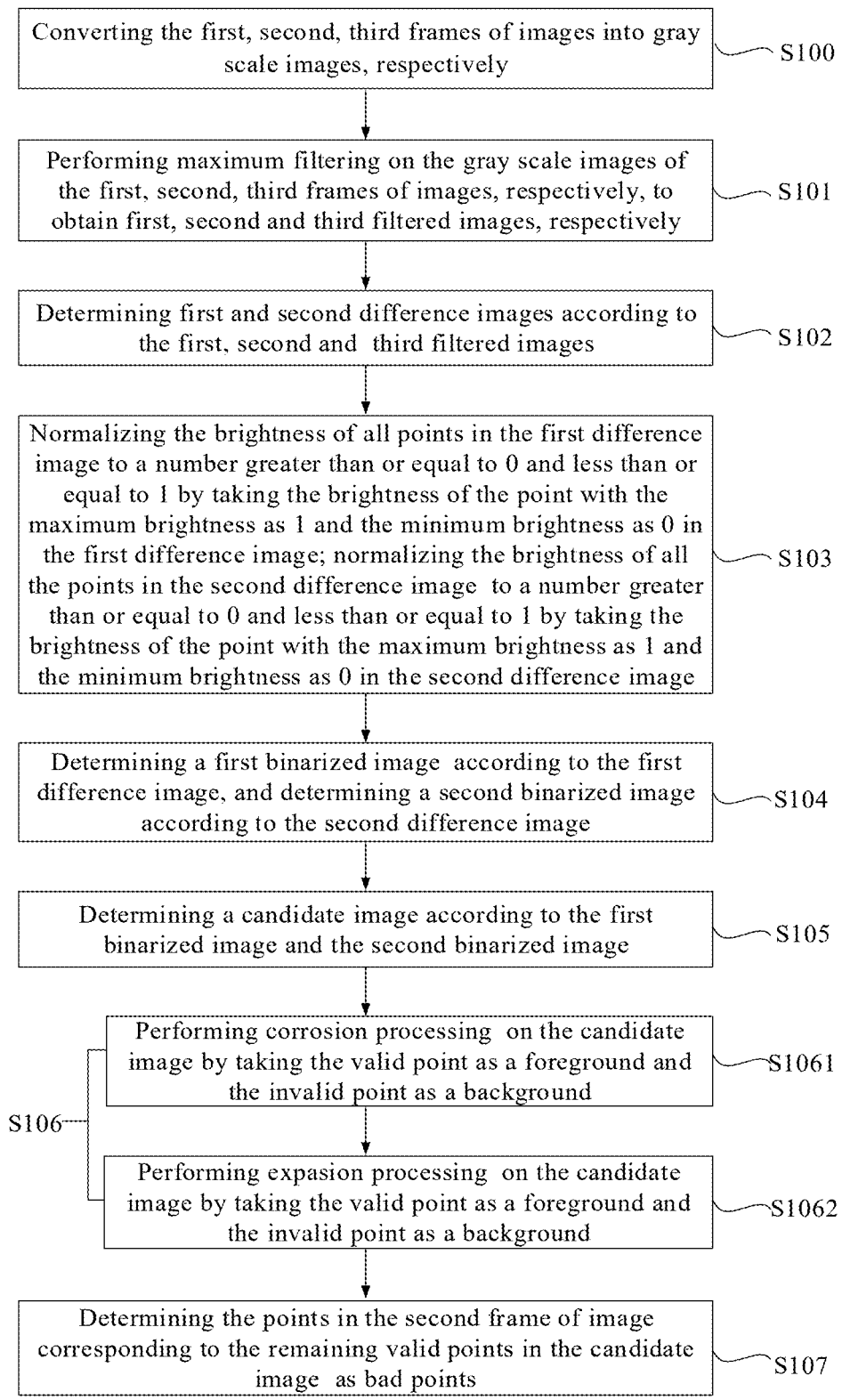
FIG. 3 is a flowchart of a method for white point detection in a video according to an embodiment of the present disclosure.

For example, the first frame of image f1, the second frame of image f2 and the third frame of image f3 in this step may be specifically with reference to FIG. 2; it should be understood that the drawings in FIG. 2 are all gray scale images since the patent drawings are monochromatic, but it should be understood that the actual first frame of image, second frame of image, and third frame of image may be in color.

It should be understood that the above first frame of image, second frame of image, and third frame of image refer to any consecutive three frames of images in the video, and are not necessarily the first three frames of images of the entire video. That is, when the method of the embodiment of the present disclosure is applied to any three frames of images in a video, the first one of the three frames of images is the first frame of image, the last one of three frames of images is the third frame of image, and the middle one of three frames of images is the second frame of image.

In the embodiment of the present disclosure, by performing maximum filtering or minimum filtering on each of the frames of images, the brightness of a local range of points (which may be white points) with relatively large brightness in the image may be increased, or the brightness of a local range of points (which may be black points) with relatively dark brightness may be decreased, so that the difference in a bad point (a white point or a black point) region between this frame of image and other frames of images is more significant, and the bad points are more easily detected.

At step S002, a first difference image and a second difference image are determined according to the first filtered image, the second filtered image and the third filtered image.

When the extreme filtering is the maximum filtering, the brightness of each point in the first difference image is the difference between the brightness of the corresponding point in the second filtered image and the brightness of the corresponding point in the first filtered image, and the brightness of each point in the second difference image is the difference between the brightness of the corresponding point in the second filtered image and the brightness of the corresponding point in the third filtered image.

When the extreme filtering is minimum filtering, the brightness of each point in the first difference image is the difference between the brightness of the corresponding point in the first filtered image and the brightness of the corresponding point in the second filtered image, and the brightness of each point in the second difference image is the difference between the brightness of the corresponding point in the third filtered image and the brightness of the corresponding point in the second filtered image.

In this step, in the above continuous three frames of images, the brightness of the corresponding points (i.e., the points at the same relative position) in each adjacent two frames of images are subtracted to obtain a first difference image representing the brightness difference between the first frame of image (the first filtered image) and the second frame of image (the second filtered image), and a second difference image representing the brightness difference between the second frame of image (the second filtered image) and the third frame of image (the third filtered image), respectively, i.e., the brightness of each point in the "difference image" is the difference between the brightness of the corresponding points in the adjacent two frames of images (the filtered images).

The calculation method of the brightness of each point in the difference image is determined depending on different modes of the extreme filtering.

When the extreme filtering is the maximum filtering (i.e., white point detection), the brightness of each point in the difference images is obtained by subtracting the brightness of the corresponding point in the first filtered image or the third filtered image from the brightness of the corresponding point in the second filtered image; that is, the brightness of each point in the difference image is the degree to which a point in the second filtered image is "brighter" than the corresponding point in the adjacent filtered image.

When the extreme filtering is the minimum filtering (i.e., black point detection), the brightness of each point in the difference image is obtained by subtracting the brightness of the corresponding point in the second filtered image from the brightness of the corresponding point in the first filtered image or the third filtered image; that is, the brightness of each point in the difference image is the degree to which a point in the second filtered image is "darker" than the corresponding point in the adjacent filtered image.

It can be seen that the above steps mainly determine the points in the second frame of image that are "brighter" or "darker" than the points in the adjacent frames of images, that is, determine the points that are very bright or very dark in the second frame of image while have moderate brightness in the adjacent frames of images. These points may be the points that have "normal" brightness in the adjacent frame of image, and have an "abnormal" brightness in the second frame of image due to data damage or the like, that is, these points are highly likely to be bad points (white or black points).

It should be understood that, for any one of the first frame of image, the second frame of image, and the third frame of image, the minimum brightness of any point may be 0 (i.e., "not bright at all", but "not bright at all" is also one of the brightness attributes of the point), and the maximum brightness is the maximum value (e.g., a gray scale of 255) corresponding to the current video format.

It will be appreciated that the result of subtraction directly with the brightness may be a "negative value" when calculating the difference. Obviously, it is meaningless if the brightness value is negative (the brightness value may be 0, but it is impossible to be negative), so in consideration of the simplicity and convenience of operation, if the brightness value of a certain point in the difference image obtained by calculation is negative, the brightness may be uniformly set to be 0.

At step S003, a candidate image is determined according to the first difference image and the second difference image.

In the candidate image, a point whose corresponding point in the first difference image has a brightness exceeding the first threshold and whose corresponding point in the second difference image has a brightness exceeding the second threshold is a valid point, and other points are invalid points.

After the first difference image and the second difference image are obtained, the candidate image may be determined continuously according to the first difference image and the second difference image. Each point in the candidate image has a corresponding point in each of the first difference image and the second difference image, and if the brightness of both the corresponding points exceeds a predetermined value (a first threshold value, a second threshold value), the point in the candidate image is a "valid point", for example, the value of the valid point is "1"; if not both of the corresponding points in the first difference image and the second difference image have a brightness exceeding the predetermined value (e.g., the corresponding point in only one of the difference images has a brightness exceeding the predetermined value, or the brightness of the corresponding points in both of the difference images does not exceed the predetermined value), the point in the candidate image is an "invalid point", for example, the value of the invalid point is "0".

As can be seen, the valid point in the candidate image actually represents a point in the second frame of image, whose brightness difference from those in the adjacent two frames of images conforms to a predetermined direction (i.e., slightly brighter or slightly darker) and has a larger value.

That is, when the extreme filtering is maximum filtering (i.e., white point detection), the valid points in the candidate image represent corresponding points in the second frame of image, which are significantly "brighter" than the corresponding points in the first and third frames of images.

When the extreme filtering is the minimum filtering (i.e., black point detection), the valid points in the candidate image represent corresponding points in the second frame of image, which are significantly "darker" than the corresponding points in both the first and third frames of images.

Therefore, the valid point in the candidate image is more likely to be a bad point in the video (particularly, in the second frame of image).

At step S004, at least part of points in the second frame of image corresponding to the valid points in the candidate image is/are determined as bad point(s).

Specifically, it may be determined that, among all points in the second frame of image corresponding to valid points in the above candidate image, at least some points are bad points (or bad points in the video) of the second frame of image, i.e., points that have incorrect display content due to data damage.

After the bad points are determined, video repair, video quality evaluation and the like can be continuously performed according to the determined bad points, and a detailed description thereof is omitted here.

It can be seen that actually in the method of the embodiment of the present disclosure, a white point or a black point (i.e., a point that is brighter or darker than that in an adjacent frame of image) in a single frame of image (a second frame of image) is detected, and the detected image (the second frame of image) should be an intermediate frame of image in consecutive three frames of images, that is, in the embodiment of the present disclosure, a previous frame of image (the first frame of image) and a next frame of image (the third frame of image) with respect to the detected image are needed to implement the detection.

Obviously, for a piece of video, the detected image (the second frame of image) may be any image except the first and last frames of images, that is, except the first and last frames of images in the video, other images may be detected as the second frame of image by the method of the embodiment of the present disclosure.

In some embodiments, referring to FIGS. 3 to 11, when a white point in a video needs to be detected, the method for detecting bad points in a video of the embodiments of the present disclosure may include the following steps S100 to S107.

At step S100, the first frame of image, the second frame of image and the third frame of image are converted into gray scale images, respectively.

The brightness of each point of the gray scale images is represented by a gray scale value.

Many videos are in color, that is, the brightness of each point in each frame of image needs to be represented by a plurality of brightness components of different colors, for example, by the brightness components of three colors of red, green and blue, and such a brightness representation manner is complicated in operation in the subsequent process.

Figure 4:
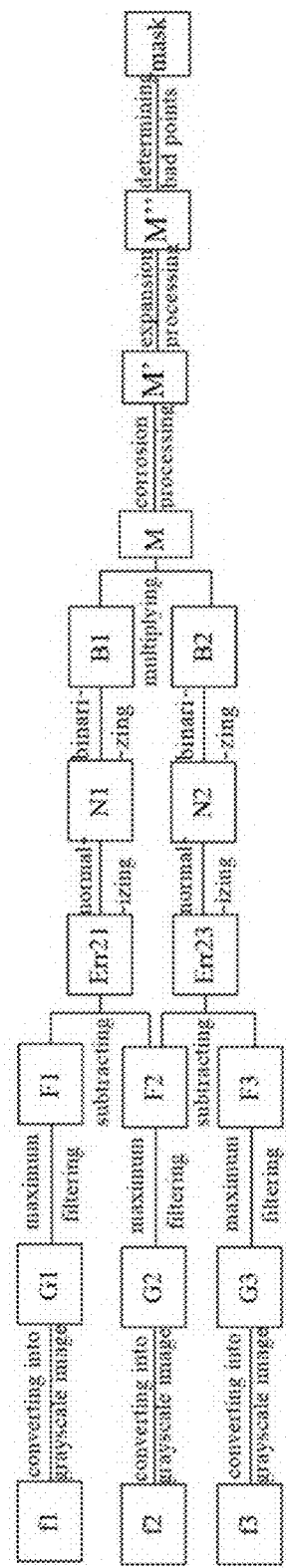
FIG. 4 is a schematic diagram of a process of processing an image in a method for white point detection in a video according to an embodiment of the present disclosure.

To this end, referring to FIG. 4, the first frame of image f1, the second frame of image f2, and the third frame of image f3 in color in the video are converted into gray scale images G1, G2, and G3 having only gray scale and no color, respectively, that is, an image in which the brightness of each point is represented by only one value (a gray scale value).

It should be understood that since the drawings in the patent are monochrome, the first frame of image G1, the second frame of image G2, and the third frame of image G3 in the form of gray scale images and the first frame of image f1, the second frame of image f2, and the third frame of image f3 in the form of color images appear the same in the drawings in the patent, for example, they may be all with reference to FIG. 2.

Specific ways of converting color images into gray scale images are known.

For example, if the brightness components (e.g., the gray scale values of the corresponding colors) of the red, green and blue colors of each point in the color image are R, G, B, respectively, the converted brightness (e.g. gray scale value) Gray thereof may be calculated by the following formula: Gray=R*0.299+G*0.587+B*0.114.

Of course, it should be understood that this step is optional.

For example, when each frame of image in the video is originally a gray scale image, this step is not necessary.

Alternatively, even for a color image, this step may not be performed, and only when brightness is calculated subsequently, the total brightness needs to be calculated by the brightness components of the respective colors together.

At step S101, maximum filtering is performed on the gray scale image of the first frame of image, the gray scale image of the second frame of image and the gray scale image of the third frame of image, respectively, to obtain a first filtered image, a second filtered image and a third filtered image, respectively.

Figure 5:
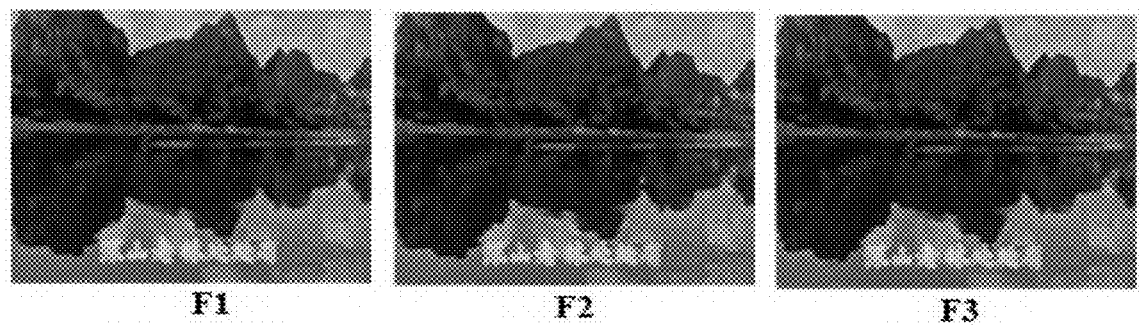
FIG. 5 is a schematic diagram of three filtered images in a method for white point detection in a video according to an embodiment of the present disclosure.

Since white points are to be detected, referring to FIG. 4, maximum filtering is performed on the gray scale image G1 of the first frame of image, the gray scale image G2 of the second frame of image, and the gray scale image G3 of the third frame of image, respectively, to obtain a first filtered image F1, a second filtered image F2, and a third filtered image F3, which may be specifically with reference to FIG. 5.

The maximum filtering is a filtering processing method for an image, and is to traverse each position of the whole image with a window of a certain shape, and, at each position, replace the brightness (such as a gray scale value) of a point corresponding to a predetermined position of the window with the maximum value of the brightness of all points within the range of the window.

In some embodiments, the predetermined position is the center of the window.

As one way, the center of the window may be used as the above predetermined position, e.g., the brightness of the point corresponding to the geometric center of the window may be replaced.

In some embodiments, the window is a square whose side length is an odd number, and the predetermined position is the center of the square.

As one way, the window may be a square whose side length is an odd number (the window length being the side length thereof), and at this time, the predetermined position is the center of the square.

For example, when the image is of a rectangle of 5*4, if a 3*3 square window is used to perform the maximum filtering, the center position of the square window should be located at each position of the image (that is, 5*4=20 positions in total); when the square is located at each position, the brightness of the point corresponding to the center of the square is replaced with the maximum brightness of the points corresponding to all the positions of the square.

It can be seen that when a square is located in a partial position of an image, the square may have a portion "beyond" the image, and this portion of the square may be considered as "having no corresponding point"; or the above image can be "expanded" by some algorithms, that is, adding a "circle" of points to the outermost side of the image, so that all portions of the square have corresponding points when the square is located at any position; or the square may be located such that the square is not at any position "beyond" the image, which obviously reduce the number of positions where the square is located, and the resulting image may also be "reduced".

In some embodiments, the step S101 specifically includes: for each of the first frame of image, the second frame of image, and the third frame of image, extreme filtering (maximum filtering) is performed a plurality of times using a plurality of windows having sequentially reduced lengths.

In some embodiments, the window is square; the length (side length of square) of the window is an odd number greater than or equal to 3 and less than or equal to 9; further, the window has lengths of 7 and 5.

The unit of the window length is the "number" of points in the image.

In order to improve the filtering effect, in the embodiment of the present disclosure, the maximum filtering is performed several times on the same image with multiple windows having sequentially reduced lengths (or so-called window length).

For example, the maximum filtering may specifically be maximum filtering performed twice with a square with a side length of 7 and a square with a side length of 5 in sequence, and the brightness of the point corresponding to the center of the square is replaced each time. After repeated verification, the effect of such maximum filtering is the best.

At step S102, a first difference image and a second difference image are determined according to the first filtered image, the second filtered image and the third filtered image.

The brightness of each point in the first difference image is the difference between the brightness of the corresponding point in the second filtered image and the brightness of the corresponding point in the first filtered image, and the brightness of each point in the second difference image is the difference between the brightness of the corresponding point in the second filtered image and the brightness of the corresponding point in the third filtered image.

Referring to FIG. 4, the brightness (gray scale value) of each point in the second filtered image F2 minus the brightness of the corresponding point in the first filtered image F1 is the brightness of the corresponding point in the first difference image Err21, that is, the first difference image Err 21 is obtained). That is, the brightness of each point in the first difference image Err21 represents the degree to which the corresponding point in the second filtered image F2 is "brighter" than the corresponding point in the first filtered image F1.

Similarly, the brightness (gray scale value) of each point in the second filtered image F2 minus the brightness of the corresponding point in the third filtered image F3 is the brightness of the corresponding point in the second difference image Err23, that is, the second difference image Err 23 is obtained. That is, the brightness of each point in the second difference image Err23 represents the degree to which the corresponding point in the second filtered image F2 is "brighter" than the corresponding point in the third filtered image F3.

It is obvious that a negative value of the brightness is not of practical significance, and therefore, in consideration of the simplicity and convenience of operation, the brightness can be uniformly set to be 0 if the brightness of a certain point in the calculated difference image has a negative value.

Figure 6:
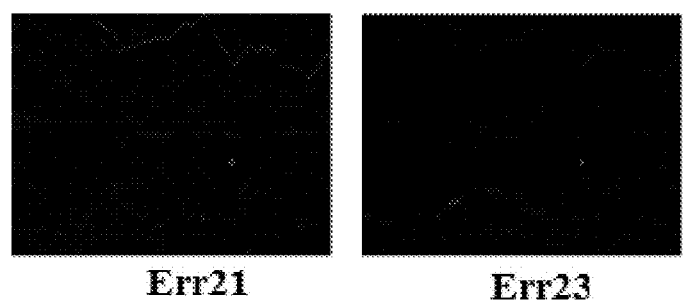
FIG. 6 is a schematic diagram of two difference images in a method for white point detection in a video according to an embodiment of the present disclosure.

A specific example of the first difference image Err21 and the second difference image Err23 may be with reference to FIG. 6.

At step S103, the brightness of all points in the first difference image is normalized to a number greater than or equal to 0 and less than or equal to 1 by taking the brightness of the point in the first difference image with the maximum brightness as 1 and the minimum brightness as 0; the brightness of all the points in the second difference image is normalized to a number greater than or equal to 0 and less than or equal to 1 by taking the brightness of the point in the second difference image with the maximum brightness as 1 and the minimum brightness as 0.

Referring to FIG. 4, for the convenience of subsequent processing, the first difference image Err21 and the second difference image Err23 may be normalized by normalizing the maximum brightness of the difference images to 1 and normalizing the minimum brightness (e.g., a gray scale of 0) that the difference images may have in theory to 0, so as to normalize the brightness of all the points to a value between 0 and 1, and obtain the normalized first difference image N1 and the normalized second difference image N2.

Figure 7:
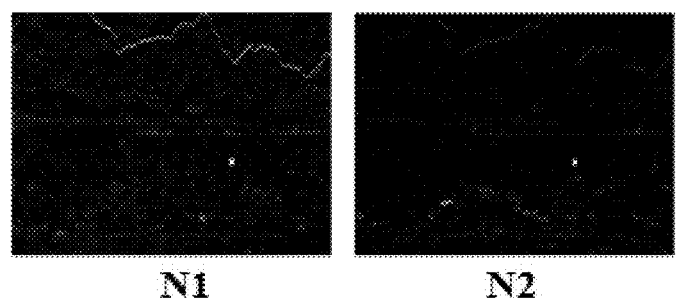
FIG. 7 is a schematic diagram of two normalized difference images in a method for white point detection in a video according to an embodiment of the present disclosure.

An specific example of the normalized first difference image N1 and second difference image N2 may be with reference to FIG. 7, where for clarity, the point with brightness of 1 in FIG. 7 is shown as having the maximum brightness (e.g., a gray scale of 255).

As an example, the brightness value N of each point in the normalized difference image may be calculated by the following formula: $N=E/M$, where E is the brightness value of the point in the difference image before normalization, and M is the maximum brightness value in the difference image before normalization.

Obviously, since the maximum brightness value actually existing before normalization is taken as a basis (i.e., the maximum brightness value actually existing before normalization is normalized to 1), it is inevitable that the maximum brightness value in any difference image after normalization is 1; in contrast, the difference image may have the minimum brightness of 0 (e.g., a gray scale of 0), but since there may be actually no point with brightness of 0 in the difference image, a point with brightness of 0 is not always existed in each normalized difference image in spite of the theoretically smallest brightness value 0 in the normalized difference image.

At step S104, a first binarized image is determined according to the first difference image, and a second binarized image is determined according to the second difference image.

In the first binarized image, a point whose corresponding point in the first difference image has a brightness exceeding a first threshold value is a first valid point, and in the second binarized image, a point whose corresponding point in the second difference image has a brightness exceeding a second threshold value is a second valid point.

Referring to FIG. 4, the first difference image and the second difference image are "binarized", i.e., all points in each image are classified into "two types", respectively, to obtain a first binarized image B1 from the first difference image and a second binarized image B2 from the second difference image.

Specifically, the step is to analyze the brightness of each point in the first difference image and to obtain a corresponding first binarized image; if the brightness of a certain point in the first difference image exceeds a first threshold, the corresponding point (a point at the same position) in the corresponding first binarized image is a first valid point; on the contrary, if the brightness of a certain point in the first difference image does not exceed the first threshold, the corresponding point (point at the same position) in the corresponding first binarized image is a first invalid point; that is, the first binarized image is an image (a first binarized image B1) having only two values obtained by binarizing the first difference image.

Similarly, the brightness of each point in the second difference image is analyzed, and a corresponding second binarized image is obtained; if the brightness of a certain point in the second difference image exceeds a second threshold, the corresponding point (a point at the same position) in the corresponding second binarized image is a second valid point; on the contrary, if the brightness of a certain point in the second difference image does not exceed the second threshold, the corresponding point (a point at the same position) in the corresponding second binarized image is a second invalid point; that is, the second binarized image is an image (a second binarized image B2) having only two values obtained by binarizing the second difference image.

Exemplarily, the first valid point is represented by 1 and the first invalid point is represented by 0 in the first binarized image; and the second valid point is represented by 1 and the second invalid point is represented by 0 in the second binarized image.

Figure 8:
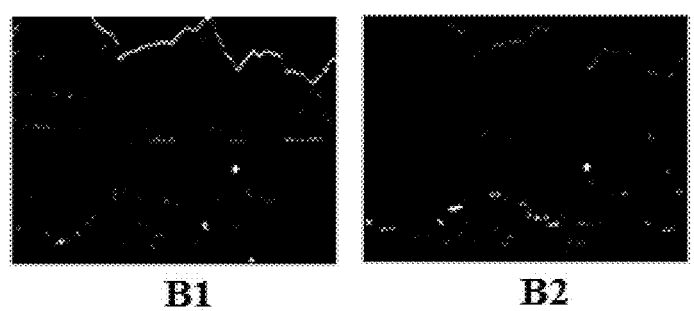
FIG. 8 is a schematic diagram of two binarized images in a method for white point detection in a video according to an embodiment of the present disclosure.

A specific example of the first binarized image B1 and second binarized image B2 is with reference to FIG. 8, and for clarity, the first valid point or the second valid point is represented by a white point and the first invalid point or the second invalid point is represented by a black point in FIG. 8.

In some embodiments, the first threshold value T1 is calculated by the following formula: $T1=(1-minN1)*factor$; and the second threshold value T2 is calculated by the following formula: $T2=(1-minN2)*factor$.

The minN1 is the normalized brightness of the point whose brightness is minimum in the first difference image, the minN2 is the normalized brightness of the point whose brightness is minimum in the second difference image, and the factor is a preset coefficient larger than 0 and smaller than 1.

In some embodiments, the factor is greater than or equal to 0.1 and less than or equal to 0.5.

When normalized in the above manner, the maximum brightness in each difference image must be 1, and the minimum brightness is minN1 or minN2, so that (1−minN1) or (1−minN2) represents the difference between the maximum brightness and the minimum brightness actually present in the difference image.

The threshold used in the binarization decision may be obtained by multiplying the difference between the maximum brightness and the minimum brightness by a preset coefficient factor, wherein the coefficient factor is inevitably greater than 0 and less than 1, and more preferably between 0.1 and 0.5. It is found that such a parameter range can obtain a relatively moderate processing effect, and can obtain the effective point (potential dead point) more accurately.

At step S105, a candidate image is determined according to the first binarized image and the second binarized image.

In the candidate image, the point whose corresponding point in the first binarized image is the first valid point and whose corresponding point in the second binarized image is the second valid point is a valid point, and other points are invalid points. For example, the value of the valid point is "1"; while the remaining points in the candidate image are invalid points, for example, the value of the invalid point is "0".

Referring to FIG. 4, there are some valid points (the first valid points or the second valid points) in the above first binarized image B1 and second binarized image B2, respectively, so a candidate image M can be determined based on them; for a point in the candidate image, if its corresponding point in the first binarized image is the first valid point and its corresponding point of the point in the second binarized image is the second valid point, the point is the valid point of the candidate image; for a point in the candidate image, if at least one of its corresponding point in the first binarized image and its corresponding point in the second binarized image is not a valid point (the first valid point or the second valid point), the point is an invalid point of the candidate image.

Figure 9:
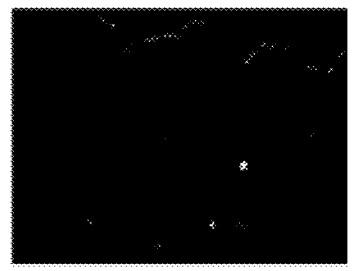
FIG. 9 is a schematic diagram of a candidate image in a method for white point detection in a video according to an embodiment of the present disclosure.

A specific example of the candidate image M may be with reference to FIG. 9, and in FIG. 9, the valid points are represented by white points and the invalid points are represented by black points for clarity.

Specifically, when the first valid point in the first binarized image and the second valid point in the second binarized image are represented by 1, and when the first invalid point in the first binarized image and the second invalid point in the second binarized image are represented by 0, this step may be implemented by "multiplying" the first binarized image and the second binarized image, that is, multiplying a value (1 or 0) of each point in the first binarized image by a value (1 or 0) of a corresponding point in the second binarized image, and obtaining the multiplication result as a value (1 or 0) of the corresponding point in the candidate image.

Obviously, for a point in the candidate image, only when the value of its corresponding point in the first binarized image and the value of its corresponding point in the second binarized image are both 1 (i.e., the two corresponding points are the first valid point and the second valid point, respectively), the point in the candidate image has a value of 1, that is, it is a valid point; and the values of other points in the candidate image are all 0 and are all invalid points.

Of course, it should be understood that the above steps of normalizing, binarizing, multiplying the images, etc. are optional.

For example, normalization may not be performed, and accordingly, specific brightness values may be directly set as the first threshold and the second threshold (exemplarily, the first threshold and the second threshold may be specifically set according to the maximum value and the minimum value of the brightness according to the interpolated picture), so that binarization may be directly performed according to the specific brightness values.

For another example, instead of performing normalization and binarization, it may be directly determined whether the brightness (gray scale value) of each point in the first difference image and the second difference image exceeds the first threshold and the second threshold one by one, so as to determine which points in the candidate image are valid points and which points are invalid points.

For another example, the values of the valid points (the first valid points, the second valid points) and the invalid points (the first invalid points, the second invalid points) after binarization may not be represented by 1 or 0, and thus the candidate image may not be determined by the manner of image multiplication; for example, the values of the valid points (the first valid point, the second valid point) and the invalid points (the first invalid point, the second invalid point) after binarization may be represented by 2 and 1, respectively, and the candidate image is obtained by adding the values of the corresponding points in the first binarized image and the second binarized image, and the point whose added value is 4 is used as the valid point, and the remaining points are invalid points.

It should be understood that the different specific ways of mathematically implementing the above processes are various and therefore will not be described in detail here.

At step S106, discrete valid points in the candidate image are removed.

That is, relatively independent, small-area valid points in the candidate image are removed by some means, because these small-area valid points are usually caused by motion of the scene, rather than actual bad points in the video.

In some embodiments, this step (S106) includes following steps S1061 and S1062.

At step S1061, a corrosion processing is performed on the candidate image by taking the valid point as a foreground and the invalid point as a background.

Referring to FIG. 4, a corrosion processing is performed on the candidate image M by taking the valid point (or 1) as the foreground and the invalid point (or 0) as the background, so as to obtain a corroded candidate image M'.

Figure 10:
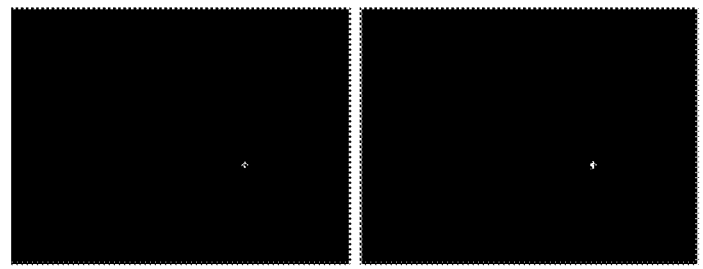
FIG. 10 is a schematic diagram of a candidate image after corrosion processing and expansion processing in a method for white point detection in a video according to an embodiment of the present disclosure.

A specific example of the corroded candidate image M' may be with reference to FIG. 10, and in FIG. 10, the valid points are represented by white points and the invalid points are represented by black points for clarity.

The principle of the corrosion processing (or corrosion algorithm) is as follows. Each point of the image is traversed by a structural element (filter kernel), and when the structural element is located at each position, an "AND operation (or convolution)" is performed on the structural element with all the points currently covered by the structural element, and the value of the point in the middle of the structural element is replaced with the minimum value obtained after the "AND operation". Therefore, when a structural element is positioned at the edge of a foreground (i.e., valid points or 1) graph, it can change the edge point of the foreground graph into a background (i.e., the edge point is changed from the valid point into an invalid point or from 1 into 0), so that the corrosion processing is equivalent to the effect of "shrinking" down the foreground (i.e., the valid points) graph. As such, all the discrete valid points are the edges of the foreground graph, and may be completely removed by the corrosion processing.

At step S1062, an expansion processing is performed on the candidate image by taking the valid point as a foreground and the invalid point as a background.

Referring to FIG. 4, the expansion processing is further performed on the corroded candidate image M' to obtain an expanded candidate image M".

A specific example of the expanded candidate image M" may be with reference to FIG. 10.

The expansion processing (expansion algorithm) is the inverse operation of the corrosion processing, and specifically, the value of the point in the center of the structural element is replaced with the maximum value obtained after the "AND operation", so that the expansion processing is equivalent to expanding the foreground (i.e., valid point) graph, and the foreground (i.e., valid point) graph reduced in the corrosion processing can be recovered.

However, the above discrete valid points cannot be recovered in the expansion processing because they are completely removed in the corrosion processing.

Thus, by performing the corrosion processing and the expansion processing for one time, discrete valid points in the candidate image are removed, and a valid point graph having a large area is remained.

In some embodiments, the structural element for the corrosion processing is a square whose side length is greater than or equal to 7 and less than or equal to 15; the structural element for the expansion processing is a square whose side length is greater than or equal to 7 and less than or equal to 15. It is found that the structural elements can better eliminate discrete valid points, but retain the valid points corresponding to actual bad points.

Specifically, the structural elements (filter kernels) used in the corrosion processing and the expansion processing may be both squares, and the side length of each square is 7-15.

The unit of the side length of the square is the number of points in the image.

It will of course be appreciated that the process of removing discrete valid points in a candidate image may be implementing by other algorithms, such as calculating the area of a continuous valid point graph and removing valid points in the valid point graph having an area less than a predetermined value.

At step S107, the points in the second frame of image corresponding to the remaining valid points in the candidate image are determined as bad points.

Referring to FIG. 4, after the discrete valid points are removed, it may be determined that all the remaining valid points in the candidate image correspond to bad points (white points), i.e., the points in the second frame of image corresponding to the valid points in the candidate image are determined to be bad points.

Figure 11:
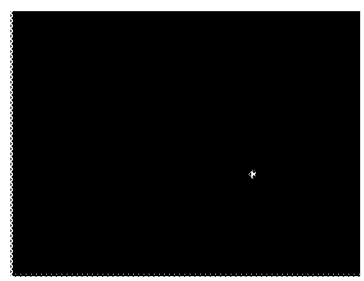
FIG. 11 is a schematic diagram of a bad point determined in a method for white point detection in a video according to an embodiment of the present disclosure.
Figure 12:
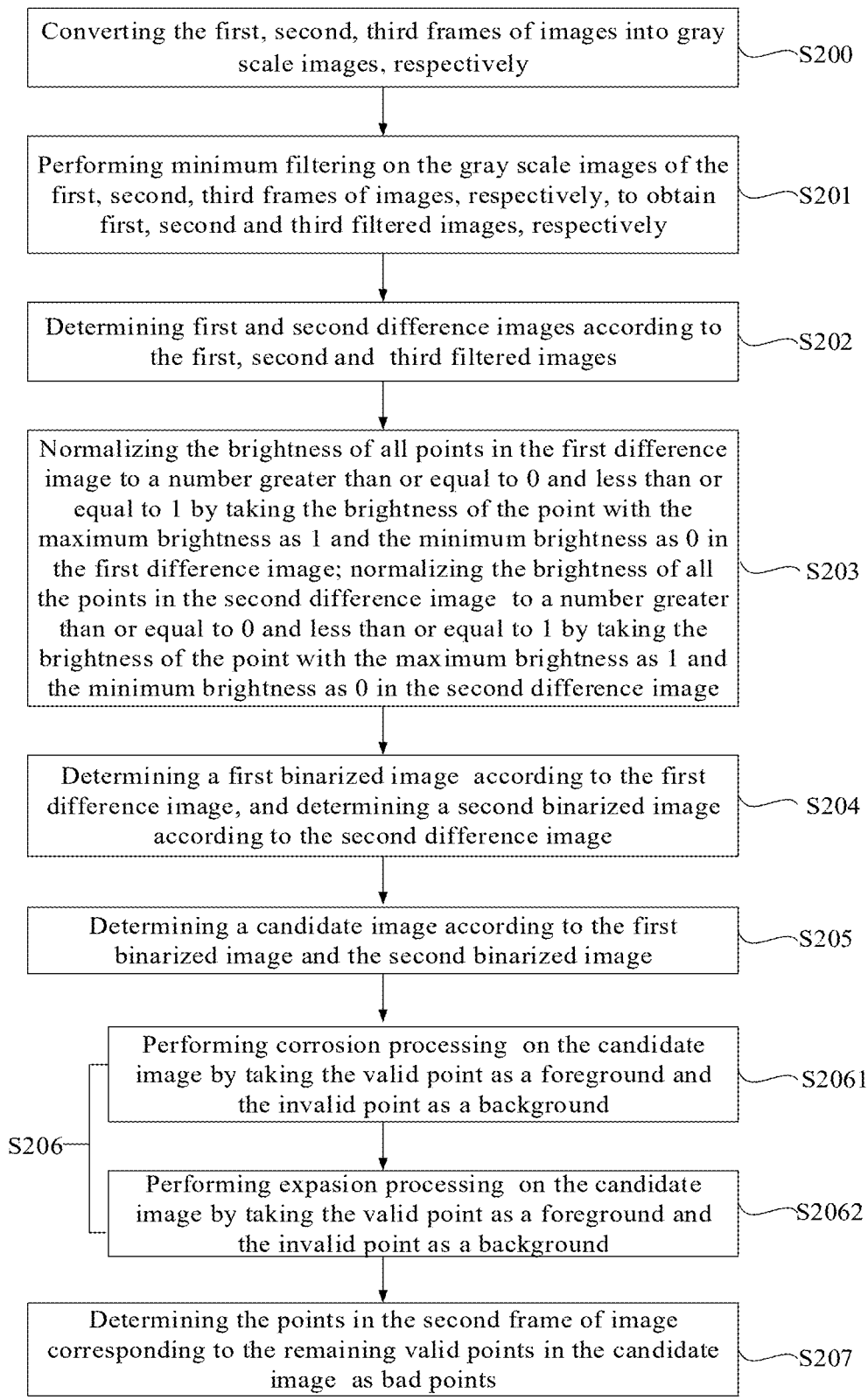
FIG. 12 is a flowchart of a method for black point detection in a video according to an embodiment of the present disclosure.

Specifically, the distribution map "mask" of the finally determined bad points in the second frame of image may be with reference to FIG. 11, where the bad points in FIG. 11 are represented by white points and the non-bad points are represented by black points.

In some embodiments, referring to FIGS. 12 to 20, when black points in a video need to be detected, the method for detecting bad points in the video of an embodiment of the present disclosure may include the following steps S200 to S207.

At step S200, the first frame of image, the second frame of image and the third frame of image are converted into gray scale images, respectively.

The brightness of each point of the gray scale image is represented by a gray scale value.

At step S201, a minimum filtering is respectively performed on the gray scale image of the first frame of image, the gray scale image of the second frame of image and the gray scale image of the third frame of image to obtain a first filtered image, a second filtered image and a third filtered image, respectively.

Figure 13:
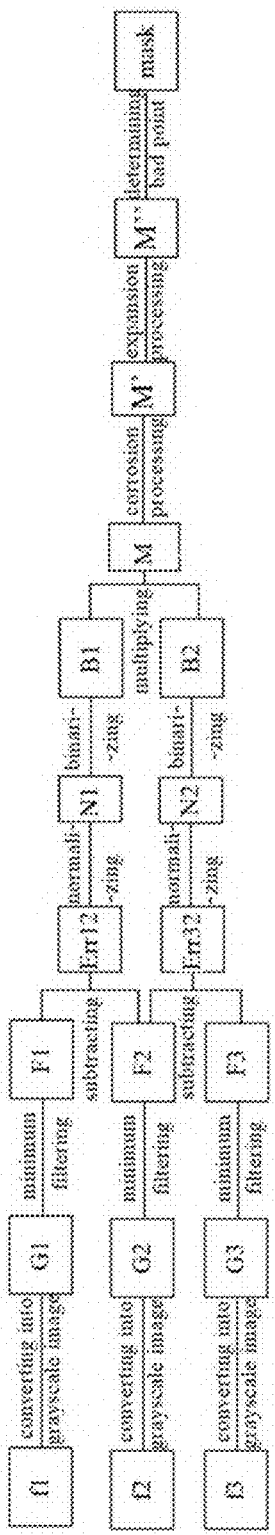
FIG. 13 is a schematic diagram of a process of processing an image in a method for black point detection in a video according to an embodiment of the present disclosure.
Figure 14:
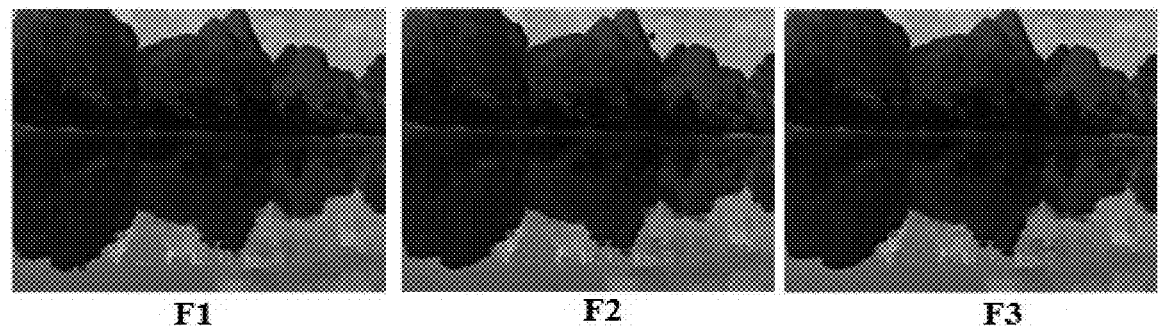
FIG. 14 is a schematic diagram of three filtered images in a method for black point detection in a video according to an embodiment of the present disclosure.

Since the black points are to be detected, referring to FIG. 13, the minimum filtering is performed on the gray scale image G1 of the first frame of image, the gray scale image G2 of the second frame of image, and the gray scale image G3 of the third frame of image, respectively, to obtain a first filtered image F1, a second filtered image F2, and a third filtered image F3, which may be specifically shown in FIG. 14.

The minimum filtering is a filtering processing method for an image, in which each position of the whole image is traversed with a window of a certain shape, and at each position, the brightness (such as a gray scale value) of a point corresponding to a predetermined position of the window is replace with the minimum value of the brightness of all points within the range of the window.

In some embodiments, the predetermined position is the center of the window.

In some embodiments, the window is a square having a side length that is an odd number, and the predetermined position is the center of the square.

In some embodiments, this step (S201) specifically includes: for each of the first frame of image, the second frame of image, and the third frame of image, the extreme filtering (the minimum filtering) is performed a plurality of times using a plurality of windows having lengths that sequentially decrease.

In some embodiments, the window is square whose length (side length of square) is an odd number greater than or equal to 3 and less than or equal to 9; further, the windows have lengths of 7 and 5.

The unit of the window length is the "number" of points in the image.

At step S202, a first difference image and a second difference image are determined according to the first filtered image, the second filtered image and the third filtered image.

The brightness of each point in the first difference image is the difference between the brightness of the corresponding point in the first filtered image and the brightness of the corresponding point in the second filtered image, and the brightness of each point in the second difference image is the difference between the brightness of the corresponding point in the third filtered image and the brightness of the corresponding point in the second filtered image.

Referring to FIG. 13, the brightness (gray scale value) of each point in the first filtered image F1 minus the brightness of the corresponding point in the second filtered image F2 is the brightness of the corresponding point in the first difference image Err12, that is, the first difference image Err is obtained. That is, the brightness of each point in the first difference image Err12 represents the degree to which the corresponding point in the second filtered image F2 is "darker" than the corresponding point in the first filtered image F1.

Similarly, the brightness (gray scale value) of each point in the third filtered image F3 minus the brightness of the corresponding point in the second filtered image F2 is the brightness of the corresponding point in the second difference image Err32, that is, the second difference image Err 32 is obtained. That is, the brightness of each point in the second difference image Err32 represents the degree to which the corresponding point in the second filtered image F2 is "darker" than the corresponding point in the third filtered image F3.

It is obvious that a negative value of the brightness is not of practical significance, and therefore, in consideration of the simplicity and convenience of operation, if the brightness of a certain point in the calculated difference image has a negative value, the brightness can be uniformly set to be 0.

Figure 15:
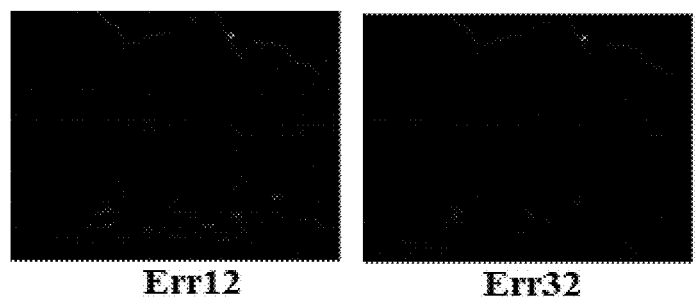
FIG. 15 is a schematic diagram of two difference images in a method for black point detection in a video according to an embodiment of the present disclosure.

A specific example of the first difference image Err21 and the second difference image Err32 may be with reference to FIG. 15.

At step S203, the brightness of all the points in the first difference image is normalized to a number greater than or equal to 0 and less than or equal to 1 by taking the brightness of the point with the maximum brightness as 1 in the first difference image and the minimum brightness as 0; the brightness of all the points in the second difference image is normalized to a number greater than or equal to 0 and less than or equal to 1 by taking the brightness of the point with the maximum brightness as 1 in the second difference image and the minimum brightness as 0.

Referring to FIG. 13, for the convenience of subsequent processing, the first difference image Err21 and the second difference image Err23 may be normalized by normalizing the maximum brightness of the difference images to 1 and normalizing the minimum brightness (e.g., a gray scale of 0) that the difference images may have in theory to 0, so as to normalize the brightness of all the points to a value between 0 and 1, and to obtain the normalized first difference image N1 and the normalized second difference image N2.

Figure 16:
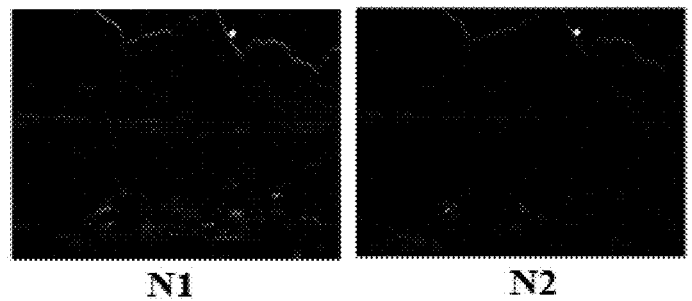
FIG. 16 is a schematic diagram of two normalized difference images in a method for black point detection in a video according to an embodiment of the present disclosure.

A specific example of the normalized first difference image N1 and second difference image N2 may be with reference to FIG. 16, and for clarity, the point with brightness of 1 in FIG. 16 is shown as having the maximum brightness (e.g., a gray scale of 255).

At step S204, a first binarized image is determined according to the first difference image, and a second binarized image is determined according to the second difference image.

In the first binarized image, a point whose corresponding point in the first difference image has a brightness exceeding the first threshold value is a first valid point, and in the second binarized image, a point whose corresponding point in the second difference image has a brightness exceeding the second threshold value is a second valid point.

Referring to FIG. 13, the first difference image and the second difference image are "binarized", respectively, i.e., all points in each image are classified into "two types", to obtain a first binarized image B1 from the first difference image and a second binarized image B2 from the second difference image.

Exemplarily, the first binarized image, a first valid point in is represented by 1, and a first invalid point is represented by 0; and in the second binarized image, the second valid point is represented by 1 and the second invalid point is represented by 0.

Figure 17:
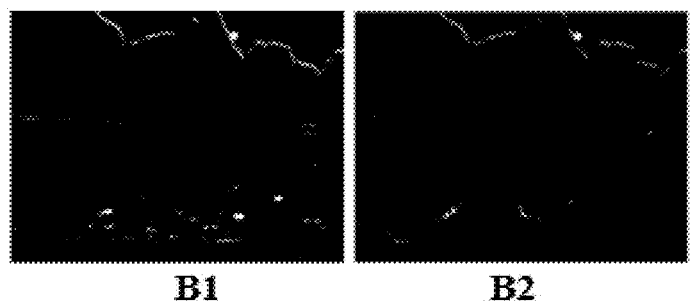
FIG. 17 is a schematic diagram of two binarized images in a method for black point detection in a video according to an embodiment of the present disclosure.

A specific example of the first binarized image B1 and the second binarized image B2 is with reference to FIG. 17, and for clarity, the first valid point or the second valid point is represented by a white point and the first invalid point or the second invalid point is represented by a black point in FIG. 17.

In some embodiments, the first threshold value T1 is calculated by the following formula: T1=(1−minN1)*factor; the second threshold value T2 is calculated by the following formula: T2=(1−minN2)*factor.

The minN1 is the normalized brightness of the point whose brightness is minimum in the first difference image, the minN2 is the normalized brightness of the point whose brightness is minimum in the second difference image, and the factor is a preset coefficient larger than 0 and smaller than 1.

In some embodiments, the factor is greater than or equal to 0.1 and less than or equal to 0.5.

At step S205, a candidate image is determined according to the first binarized image and the second binarized image.

In the candidate image, the point whose corresponding point in the first binarized image is the first valid point and whose corresponding point in the second binarized image is the second valid point is a valid point, and other points are invalid points. For example, the value of the valid point is "1"; while the remaining points in the candidate image are invalid points, for example, the value of the invalid point is "0".

Referring to FIG. 13, there are some valid points (the first valid points or the second valid points) in the above first binarized image B1 and second binarized image B2, respectively, so a candidate image M can be determined based on them; for a point in the candidate image, if its corresponding point in the first binarized image is the first valid point and its corresponding point in the second binarized image is the second valid point, the point is the valid point of the candidate image; for a point in the candidate image, if at least one of its corresponding point in the first binarized image and its corresponding point in the second binarized image is not the valid point (the first valid point or the second valid point), the point is an invalid point of the candidate image.

Figure 18:
FIG. 18 is a schematic diagram of a candidate image in a method for black point detection in a video according to an embodiment of the present disclosure.

A specific example of the candidate image M may be with reference to FIG. 18, and in FIG. 18, the valid points are represented by white points and the invalid points are represented by black points for clarity.

Specifically, when the first valid point in the first binarized image and the second valid point in the second binarized image are represented by 1, and when the first invalid point in the first binarized image and the second invalid point in the second binarized image are represented by 0, this step may be implemented by "multiplying" the first binarized image and the second binarized image, that is, multiplying a value (1 or 0) of each point in the first binarized image by a value (1 or 0) of a corresponding point in the second binarized image, and obtaining the multiplication result as a value (1 or 0) of the corresponding point in the candidate image.

At step S206, discrete valid points in the candidate image are removed.

That is, relatively independent, small-area valid points in the candidate image are removed by some means, because these small-area valid points are usually caused by motion of the scene, rather than actual bad points in the video.

In some embodiments, this step (S206) includes following steps S2061 and S2062.

At step S2061, a corrosion processing is performed on the candidate image by taking the valid point as a foreground and the invalid point as a background.

Referring to FIG. 13, a corrosion processing is performed on the candidate image M by taking the valid point (or 1) as the foreground and the invalid point (or 0) as the background, so as to obtain a corroded candidate image M'.

Figure 19:
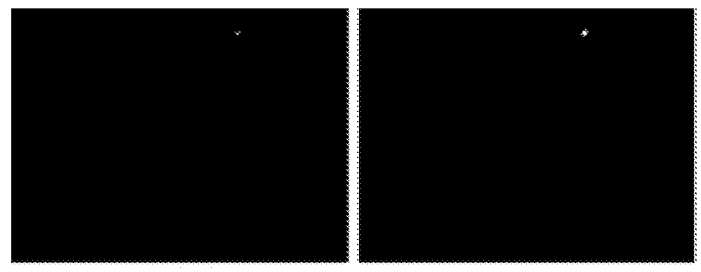
FIG. 19 is a schematic diagram of a candidate image after corrosion processing and expansion processing in a method for black point detection in a video according to an embodiment of the present disclosure.

A specific example of the corroded candidate image M' may be with reference to FIG. 19, and in FIG. 19, the valid points are indicated by white points and the invalid points are indicated by black points for clarity.

At step S2062, an expansion processing is performed on the candidate image by taking the valid point as the foreground and the invalid point as the background.

Referring to FIG. 13, the expansion processing is further to be performed on the corroded candidate image M' to obtain an expanded candidate image M".

A specific example of the expanded candidate image M" may be with reference to FIG. 19.

In some embodiments, the structural element for the corrosion processing is a square whose side length is greater than or equal to 7 and less than or equal to 15; the structural element for the expansion processing is a square whose side length is greater than or equal to 7 and less than or equal to 15.

Specifically, the structural elements (filter kernels) used in the corrosion processing and the expansion processing may be both squares, and the side length of each square is 7-15.

The unit of the side length of the square is the number of points in the image.

At step S207, the points in the second frame of image corresponding to the remaining valid points in the candidate image are determined as bad points.

Referring to FIG. 13, after the discrete valid points are removed, it may be determined that all the remaining valid points in the candidate image correspond to bad points (black points), that is, the points in the second frame of image corresponding to the valid points in the candidate image are determined to be bad points.

Figure 20:
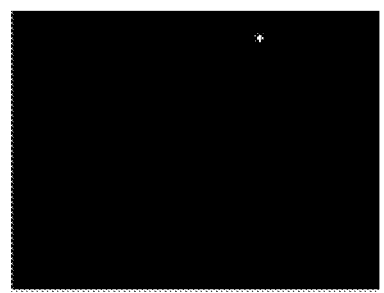
FIG. 20 is a schematic diagram of a bad point determined in a method for black point detection in a video according to an embodiment of the present disclosure.

Specifically, the distribution map "mask" of the finally determined bad points in the second frame of image may be with reference to FIG. 20, where the bad points in FIG. 20 are represented by white points and the non-bad points are represented by black points.

It can be seen that the above method for black point detection corresponds to the method for white point detection, and the actual difference between the two methods lies in that the minimum filtering is respectively performed on the first frame of image, the second frame of image and the third frame of image in a case of black point detection, and that the brightness of each point in the first difference image (or the second difference image) is a value obtained by subtracting the brightness of the corresponding point in the second filtered image from the brightness of the corresponding point in the first filtered image (or the third filtered image).

Figure 21:
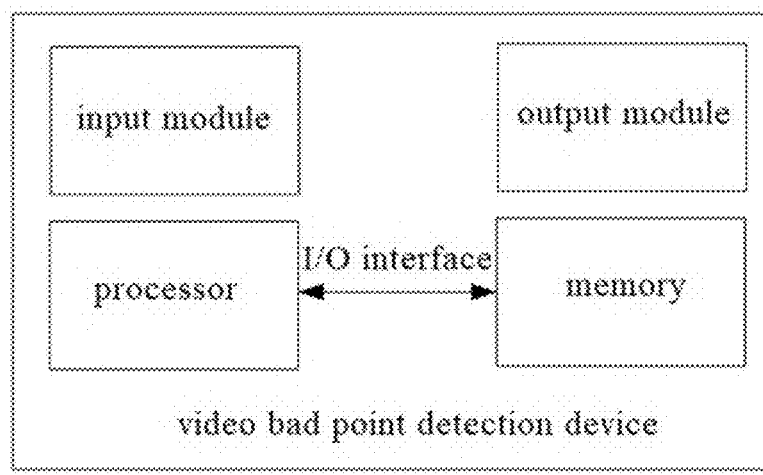
FIG. 21 is a block diagram illustrating another device for detecting bad points in a video according to an embodiment of the present disclosure.

In a second aspect, referring to FIG. 21, an embodiment of the present disclosure provides a device for detecting bad points in the video.

The device for detecting bad points in the video of the embodiment of the present disclosure can implement the above method for detecting bad points in the video, and the device includes:

an input module configured to receive a video;

an output module configured to output the detected bad point in a video;

one or more processors;

a memory having one or more programs stored thereon that when executed by the one or more processors, cause the one or more processors to implement a method for detecting bad points in the video in accordance with any of the above; and one or more input/output (I/O) interfaces connected between the one or more processors and the memory and configured to realize the information interaction between the one or more processors and the memory.

The input module refers to any device which can obtain a video to be detected by some means. For example, the input module may be specifically an interface (such as a USB interface or a network interface) for connection with a storage medium or other electronic device(s), a video capture device, or the like.

The output module is any device capable of outputting the detected bad point such that others are aware of it. For example, the output module may specifically be a display, an audio playing device, a printer, or the like, and may also be an interface (such as a USB interface or a network interface) for connection with a storage medium or other electronic device(s), a video capture device, or the like.

The processor is a device with data processing capability, and includes but is not limited to a central processing unit (CPU), a programmable logic controller (FPGA), and the like; the memory is a device with data storage capability, and includes, but not limited to, random access memory (RAM, more specifically SDRAM, DDR, etc.), read Only memory (ROM), electrically erasable programmable read only memory (EEPROM), flash memory (FLASH); the I/O interface (read/write interface) is connected between the processor and the memory, and can realize information interaction between the memory and the processor, which includes but is not limited to a data bus (Bus) and the like.

Figure 22:
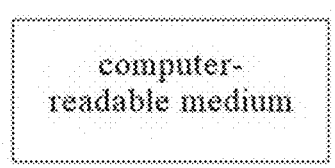
FIG. 22 is a block diagram of a computer-readable medium according to an embodiment of the disclosure.

In a third aspect, with reference to FIG. 22, an embodiment of the present disclosure provides a computer-readable medium, on which a computer program is stored, where the program, when executed by a processor, implements a method for detecting bad points in the video according to any one of the above. The computer-readable medium includes:

one or more processors;

a memory having one or more programs stored thereon, that when executed by the one or more processors, cause the one or more processors to implement any of the methods for detecting bad points in the video described above; and one or more I/O interfaces connected between the processor and the memory and configured to realize the information interaction between the processor and the memory.

One of ordinary skill in the art will appreciate that all or some of the steps, systems, functional modules/units in the devices, disclosed above may be implemented as software, firmware, hardware, and suitable combinations thereof.

In a hardware implementation, the division between functional modules/units mentioned in the above description does not necessarily correspond to the division of physical components; for example, one physical component may have multiple functions, or one function or step may be performed by several physical components in cooperation.

Some or all of the physical components may be implemented as software executed by a processor, such as a central processing unit (CPU), a digital signal processor, or a microprocessor, or as hardware, or as an integrated circuit, such as an application specific integrated circuit. Such software may be distributed on computer readable medium, which may include computer storage medium (or non-transitory storage medium) and communication medium (or transitory storage media). The term "computer storage medium" includes volatile and nonvolatile, removable and non-removable medium implemented in any method or technology for storage of information such as computer readable instructions, data structures, program modules or other data, as is well known to those skilled in the art. Computer storage medium includes, but is not limited to, random access memory (RAM, more specifically, SDRAM, DDR, etc.), read only memory (ROM), electrically erasable programmable read only memory (EEPROM), flash memory (FLASH), or other disk storage; compact disk read only memory (CD-ROM), digital versatile disk (DVD), or other optical disk storage; magnetic cassettes, magnetic tape, magnetic disk storage or other magnetic storage; any other medium which can be used to store the desired information and which can be accessed by a computer. In addition, communication medium typically embodies computer readable instructions, data structures, program modules or other data in a modulated data signal such as a carrier wave or other transport mechanism and includes any information delivery media as is well known to those skilled in the art.

The present disclosure has disclosed example embodiments, and although specific terms are employed, they are used and should be interpreted in a generic and descriptive sense only and not for purposes of limitation. In some instances, unless expressly stated otherwise, features, characteristics and/or elements described in connection with a particular embodiment may be used alone or in combination with features, characteristics and/or elements described in connection with other embodiments, as would be apparent to one skilled in the art. It will, therefore, be understood by those skilled in the art that various changes in form and details may be made therein without departing from the scope of the disclosure as set forth in the appended claims.

The invention claimed is:

1. A method of detecting bad points in a video, comprising:

performing extreme filtering respectively on a first frame of image, a second frame of image and a third frame of image which are sequentially and continuously in the video, to obtain a first filtered image, a second filtered image and a third filtered image, respectively, wherein the extreme filtering is a maximum filtering or a minimum filtering;

determining a first difference image and a second difference image according to the first filtered image, the second filtered image and the third filtered image; wherein the first difference image represents a difference in brightness between the first filtered image and the second filtered image, and the second difference image represents a difference in brightness between the second filtered image and the third filtered image;

determining a candidate image according to the first difference image and the second difference image; a point in the candidate image whose corresponding point in the first difference image has a brightness exceeding a first threshold value and whose corresponding point in the second difference image has a brightness exceeding a second threshold value is a valid point, and other points in the candidate image are invalid points; and determining that at least part of points in the second frame of image corresponding to the valid point in the candidate image are bad points, wherein the determining a candidate image according to the first difference image and second difference image comprises:

determining a first binarized image according to the first difference image, and determining a second binarized image according to the second difference image; a point in the first binarized image whose corresponding point in the first difference image has a brightness exceeding the first threshold value is a first valid point, and a point in the second binarized image whose corresponding point in the second difference image has a brightness exceeding the second threshold value is a second valid point; and determining the candidate image according to the first binarized image and the second binarized image; wherein a point in the candidate image whose corresponding point is the first valid point in the first binarized image and whose corresponding point is the second valid point in the second binarized image is a valid point, and other points in the candidate image are invalid points, before the determining the first binarized image from the first difference image and determining the second binarized image from the second difference image, the method further comprises:

normalizing a brightness of all points in the first difference image into a number greater than or equal to 0 and less than or equal to 1 by taking a brightness of a point in the first difference image with a maximum brightness as 1 and a minimum brightness as 0; normalizing a brightness of all the points in the second difference image into a number greater than or equal to 0 and less than or equal to 1 by taking a brightness of a point in the second difference image with a maximum brightness as 1 and a minimum brightness as 0;

the first threshold value T1 is calculated by following formula: T1=(1−minN1)*factor;

the second threshold value T2 is calculated by following formula: T2=(1−minN2)*factor;

wherein the minN1 is a normalized brightness of the point whose brightness is minimum in the first difference image, the minN2 is a normalized brightness of the point whose brightness is minimum in the second difference image, and the factor is a preset coefficient larger than 0 and smaller than 1.

2. The method of claim 1, wherein the performing the extreme filtering respectively on the first frame of image, the second frame of image and the third frame of image which are sequential and consecutive in the video comprises:

converting the first frame of image, the second frame of image and the third frame of image into gray scale images, respectively, wherein a brightness of each point of the gray scale images is represented by a gray scale value; and performing the extreme filtering on the gray scale image of the first frame of image, the gray scale image of the second frame of image and the gray scale image of the third frame of image, respectively.

3. The method of claim 1, wherein the performing the extreme filtering respectively on the first frame of image, the second frame of image and the third frame of image which are sequential and consecutive in the video comprises:

performing the extreme filtering multiple times, with a plurality of windows having sequentially reduced lengths, on each of the first frame of image, the second frame of image and the third frame of image.

4. The method of claim 1, wherein, the factor is greater than or equal to 0.1 and less than or equal to 0.5.

5. The method of claim 1, wherein the determining that the at least part of the points in the second frame of image corresponding to the valid point in the candidate image are bad points comprises:

removing discrete ones of the valid points in the candidate image; and determining points in the second frame of image corresponding to the remaining ones of the valid points in the candidate image as bad points.

6. The method of claim 5, wherein the removing discrete valid points in the candidate images comprises:

performing a corrosion processing on the candidate image by taking the valid points as a foreground and the invalid points as a background; and performing an expansion processing on the candidate image by taking the valid point as a foreground and the invalid point as a background.

7. The method of claim 6, wherein, a structural element for the corrosion processing is a square whose side length is greater than or equal to 7 points and less than or equal to 15 points; and a structural element for the expansion processing is a square whose side length is greater than or equal to 7 points and less than or equal to 15 points.

8. A device of detecting bad points in a video, comprising:

an input module configured to receive the video;

an output module configured to output the detected bad points in the video;

one or more processors; and a memory having one or more programs stored thereon, that when executed by the one or more processors, cause the one or more processors to implement the method of detecting bad points in the video according to claim 1; and one or more input/output interfaces connected between the one or more processors and the memory and configured to implement information interaction between the one or more processors and the memory.

9. A non-transitory computer-readable medium, on which a computer program is stored, and which performs the method of detecting bad points in the video according to claim 1, when being executed by a processor.

10. The method of claim 1, wherein the extreme filtering is the maximum filtering, a brightness of each point in the first difference image is a brightness of a corresponding point in the second filtered image minus a brightness of a corresponding point in the first filtered image, and a brightness of each point in the second difference image is a brightness of a corresponding point in the second filtered image minus a brightness of a corresponding point in the third filtered image.

11. The method of claim 1, wherein the extreme filtering is the minimum filtering, a brightness of each point in the first difference image is a brightness of a corresponding point in the first filtered image minus a brightness of a corresponding point in the second filtered image, and a brightness of each point in the second difference image is a brightness of a corresponding point in the third filtered image minus a brightness of a corresponding point in the second filtered image.

* * * * *